(12) United States Patent
Gaal et al.

(10) Patent No.: US 10,863,450 B2
(45) Date of Patent: Dec. 8, 2020

(54) POWER CONTROL IN NR-NR DUAL CONNECTIVITY

(71) Applicant: QUALCOMM Incorporated, San Diego, CA (US)

(72) Inventors: Peter Gaal, San Diego, CA (US); Xiao Feng Wang, San Diego, CA (US); Wanshi Chen, San Diego, CA (US); Seyedkianoush Hosseini, San Diego, CA (US); Heechoon Lee, San Diego, CA (US); Tingfang Ji, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/521,425

(22) Filed: Jul. 24, 2019

(65) Prior Publication Data

US 2020/0037266 A1   Jan. 30, 2020

Related U.S. Application Data

(60) Provisional application No. 62/703,309, filed on Jul. 25, 2018.

(51) Int. Cl.
*H04W 52/14* (2009.01)
*H04W 52/28* (2009.01)

(52) U.S. Cl.
CPC .................. *H04W 52/281* (2013.01)

(58) Field of Classification Search
CPC ................................................. H04W 52/281

(Continued)

(56) References Cited

U.S. PATENT DOCUMENTS 8,547,897 B2 * 10/2013 Chang ................ H04B 7/18515
370/316
8,908,511 B2 * 12/2014 Andreozzi .......... H04L 47/6215
370/230.1

(Continued)

FOREIGN PATENT DOCUMENTS

WO   WO-2017092716 A1   6/2017

OTHER PUBLICATIONS

Interdigital et al., "Power Control Modes for NR DC and NR CA", Oct. 9-10, 2017, 3GPP TSG WG1, R1-1718366; 7 pages.*

(Continued)

*Primary Examiner* — Hai V Nguyen
(74) *Attorney, Agent, or Firm* — Norton Rose Fulbright LLP

(57) ABSTRACT

Power control in new radio (NR)-to-NR dual connectivity communications is disclosed. A UE, compatible for NR-to-NR dual connectivity, may receive a transmit power configuration and a power allocation configuration. The transmit power configuration identifies the designated reserved power for each of the cell groups participating in the dual connectivity communication. The power allocation configuration identifies to the UE whether to operate access to excess transmission power by either mode 1 rules, which may introduce phase discontinuity into ongoing transmissions, or mode 2 rules, which use a look-ahead functionality to trigger joint determination and allocation of transmission power among known uplink transmissions over a given transmission duration. After the determined transmission power allocation has been made, the UE transmits the dual connectivity transmissions according to the determined power.

28 Claims, 10 Drawing Sheets

(58) Field of Classification Search
USPC .................................................. 455/522, 69
See application file for complete search history.

(56) References Cited

U.S. PATENT DOCUMENTS

| | | | | |
|---|---|---|---|---|
| 8,934,400 | B2* | 1/2015 | Speight | H04W 74/0833 |
| | | | | 370/315 |
| 8,934,401 | B2* | 1/2015 | Speight | H04W 52/46 |
| | | | | 370/315 |
| 8,948,078 | B2* | 2/2015 | Speight | H04W 52/50 |
| | | | | 370/315 |
| 10,178,632 | B2* | 1/2019 | Loehr | H04L 5/0055 |
| 10,271,351 | B1* | 4/2019 | Wang | H04L 5/0073 |
| 10,397,884 | B2* | 8/2019 | Wang | H04W 52/36 |
| 10,455,582 | B1* | 10/2019 | Li | H04W 28/20 |
| 2010/0278152 | A1* | 11/2010 | Andreozzi | H04L 47/626 |
| | | | | 370/335 |
| 2012/0301136 | A1* | 11/2012 | Chang | H04B 7/0413 |
| | | | | 398/16 |
| 2014/0241235 | A1* | 8/2014 | Speight | H04W 52/46 |
| | | | | 370/315 |
| 2014/0241236 | A1* | 8/2014 | Speight | H04W 88/04 |
| | | | | 370/315 |
| 2014/0241237 | A1* | 8/2014 | Speight | H04W 52/46 |
| | | | | 370/315 |
| 2016/0330698 | A1* | 11/2016 | Loehr | H04W 72/04 |
| 2018/0049073 | A1* | 2/2018 | Dinan | H04W 72/1257 |
| 2018/0279233 | A1* | 9/2018 | Wang | H04W 52/06 |
| 2018/0288746 | A1* | 10/2018 | Zhang | H04L 1/0031 |
| 2019/0199571 | A1* | 6/2019 | Wilson | H04W 52/146 |
| 2019/0306861 | A1* | 10/2019 | Li | H04W 72/042 |
| 2020/0008202 | A1* | 1/2020 | Li | H04W 72/042 |
| 2020/0187242 | A1* | 6/2020 | Hoglund | H04W 72/1268 |
| 2020/0245257 | A1* | 7/2020 | Pelletier | H04W 52/365 |

OTHER PUBLICATIONS

Huawei et al., "Power control for CA and DC", 3GPP Draft; R1-1712235, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Aug. 21, 2017-Aug. 25, 2017 Aug. 20, 2017, XP051315052, Retrieved from the Internet: URL:http://www.3gpp.org/ftp/Meetings_3GPP_SYNC/RAN1/Docs/ [retrieved on Aug. 20, 2017], p. 2, line 37—p. 4, line 15; figure 2 p. 5, line 10—line 19; figure 3, 6 pages.
International Search Report and Written Opinion—PCT/US2019/043499—ISA/EPO—dated Oct. 11, 2019.

* cited by examiner

POWER CONTROL IN NR-NR DUAL CONNECTIVITY

CROSS-REFERENCE TO RELATED APPLICATIONS

This application claims the benefit of U.S. Provisional Patent Application No. 62/703,309, entitled, "POWER CONTROL IN NR-NR DUAL CONNECTIVITY," filed on Jul. 25, 2018, which is expressly incorporated by reference herein in its entirety.

BACKGROUND

Field

Aspects of the present disclosure relate generally to wireless communication systems and to power control in new radio (NR)-to-NR dual connectivity.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a transmit power configuration, wherein the transmit power configuration identifies a reserved power for transmissions with each of a plurality of cell groups, wherein a sum of the reserved power for all of the plurality of cell groups remains within a maximum transmission power, receiving, by the UE, a power allocation configuration identifying either a first mode for allocating excess power above the reserved power for the transmissions over a transmission segment of a plurality of transmission segments of a transmission duration, or a second mode for allocating the excess power above the reserved power for the transmissions over the transmission duration, receiving, by the UE, an uplink grant for the transmissions with at least one cell group of the plurality of cell groups, wherein a transmission power grant associated with the uplink grant identifies a transmission power for the at least one cell group in excess of the reserved power, and transmitting, by the UE, the transmissions with the at least one cell group using a determined transmission power determined by the UE according to the power allocation configuration.

In an additional aspect of the disclosure, an apparatus configured for wireless communication includes means for receiving, at a UE, a transmit power configuration, wherein the transmit power configuration identifies a reserved power for transmissions with each of a plurality of cell groups, wherein a sum of the reserved power for all of the plurality of cell groups remains within a maximum transmission power, means for receiving, by the UE, a power allocation configuration identifying either a first mode for allocating excess power above the reserved power for the transmissions over a transmission segment of a plurality of transmission segments of a transmission duration, or a second mode for allocating the excess power above the reserved power for the transmissions over the transmission duration, means for receiving, by the UE, an uplink grant for the transmissions with at least one cell group of the plurality of cell groups, wherein a transmission power grant associated with the uplink grant identifies a transmission power for the at least one cell group in excess of the reserved power, and means for transmitting, by the UE, the transmissions with the at least one cell group using a determined transmission power determined by the UE according to the power allocation configuration.

In an additional aspect of the disclosure, a non-transitory computer-readable medium having program code recorded thereon. The program code further includes code to receive, at a UE, a transmit power configuration, wherein the transmit power configuration identifies a reserved power for transmissions with each of a plurality of cell groups, wherein a sum of the reserved power for all of the plurality of cell groups remains within a maximum transmission power, code to receive, by the UE, a power allocation configuration identifying either a first mode for allocating excess power above the reserved power for the transmissions over a transmission segment of a plurality of transmission segments of a transmission duration, or a second mode for allocating the excess power above the reserved power for the transmissions over the transmission duration, code to receive, by the UE, an uplink grant for the transmissions with at least one cell group of the plurality of cell groups, wherein a transmission power grant associated with the uplink grant identifies a transmission power for the at least one cell group in excess of the reserved power, and code to transmit, by the UE, the transmissions with the at least one cell group using a determined transmission power determined by the UE according to the power allocation configuration.

In an additional aspect of the disclosure, an apparatus configured for wireless communication is disclosed. The apparatus includes at least one processor, and a memory coupled to the processor. The processor is configured to receive, at a UE, a transmit power configuration, wherein the transmit power configuration identifies a reserved power for transmissions with each of a plurality of cell groups, wherein a sum of the reserved power for all of the plurality of cell groups remains within a maximum transmission power, to receive, by the UE, a power allocation configuration identifying either a first mode for allocating excess power above the reserved power for the transmissions over a transmission segment of a plurality of transmission segments of a transmission duration, or a second mode for allocating the excess power above the reserved power for the transmissions over the transmission duration, to receive, by the UE, an uplink grant for the transmissions with at least one cell group of the plurality of cell groups, wherein a transmission power grant associated with the uplink grant identifies a transmission power for the at least one cell group in excess of the reserved power, and to transmit, by the the transmissions with the at least one cell group using a determined transmission power determined by the UE according to the power allocation configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
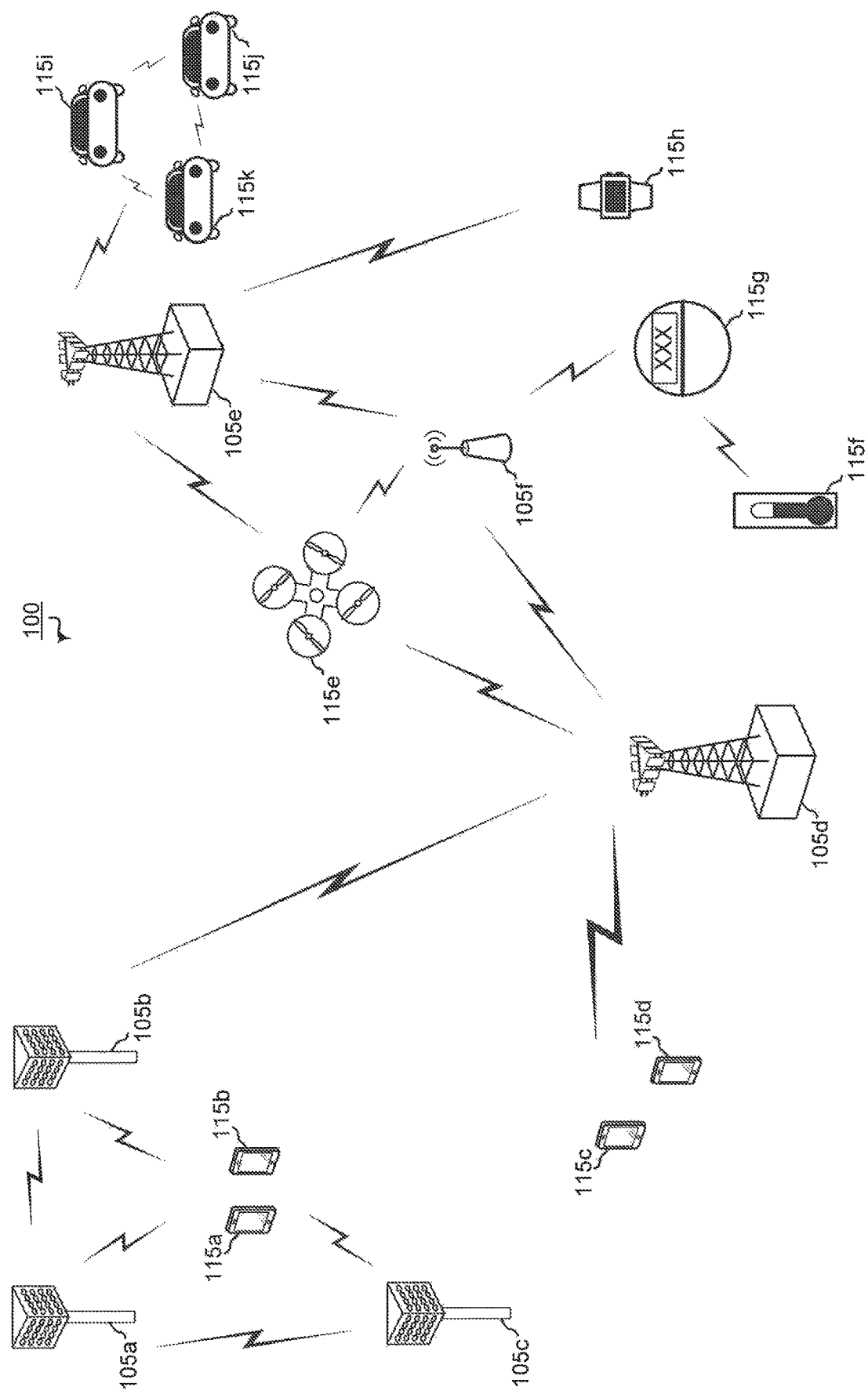
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, E networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 80120, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
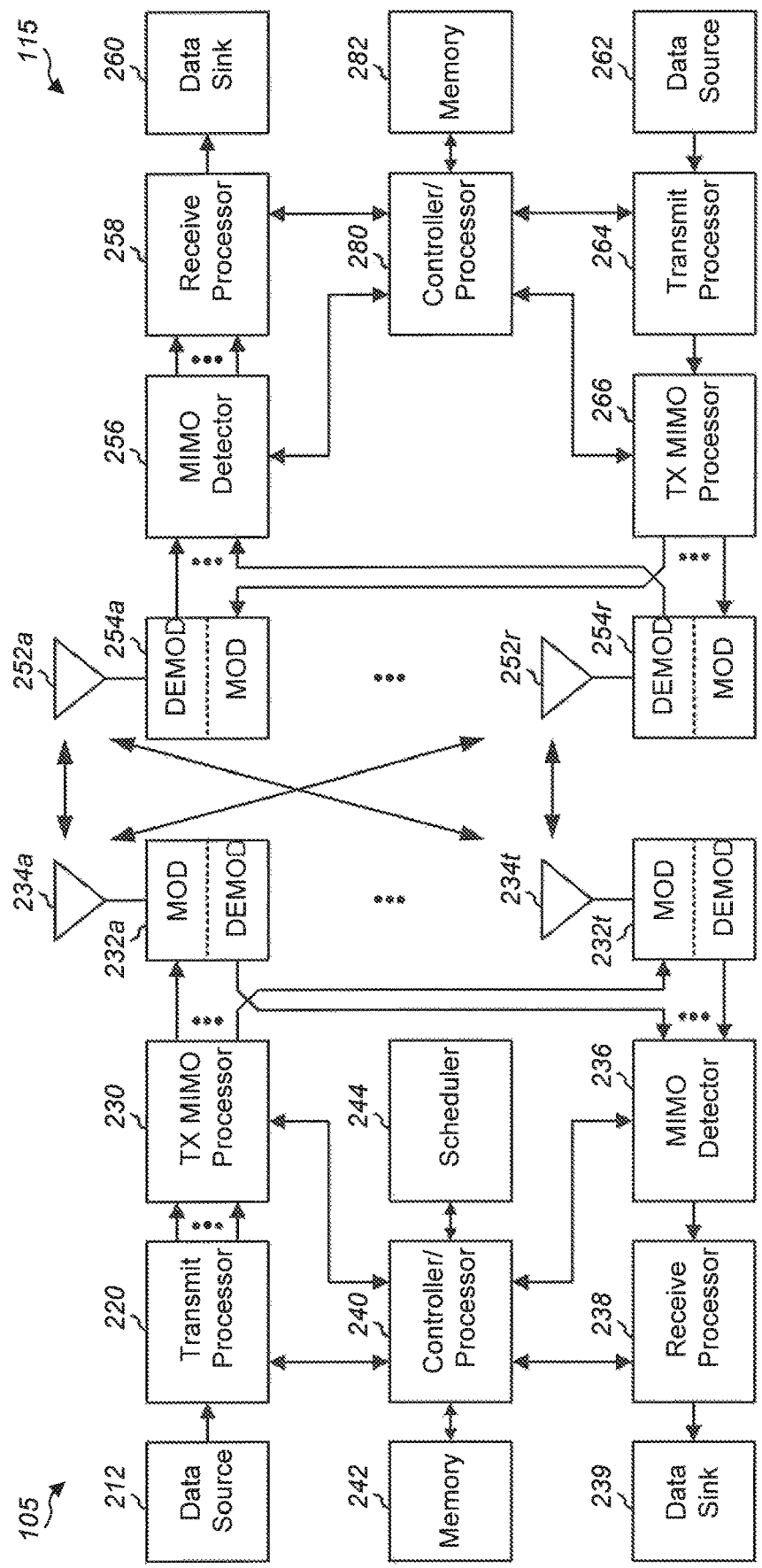
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 5, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
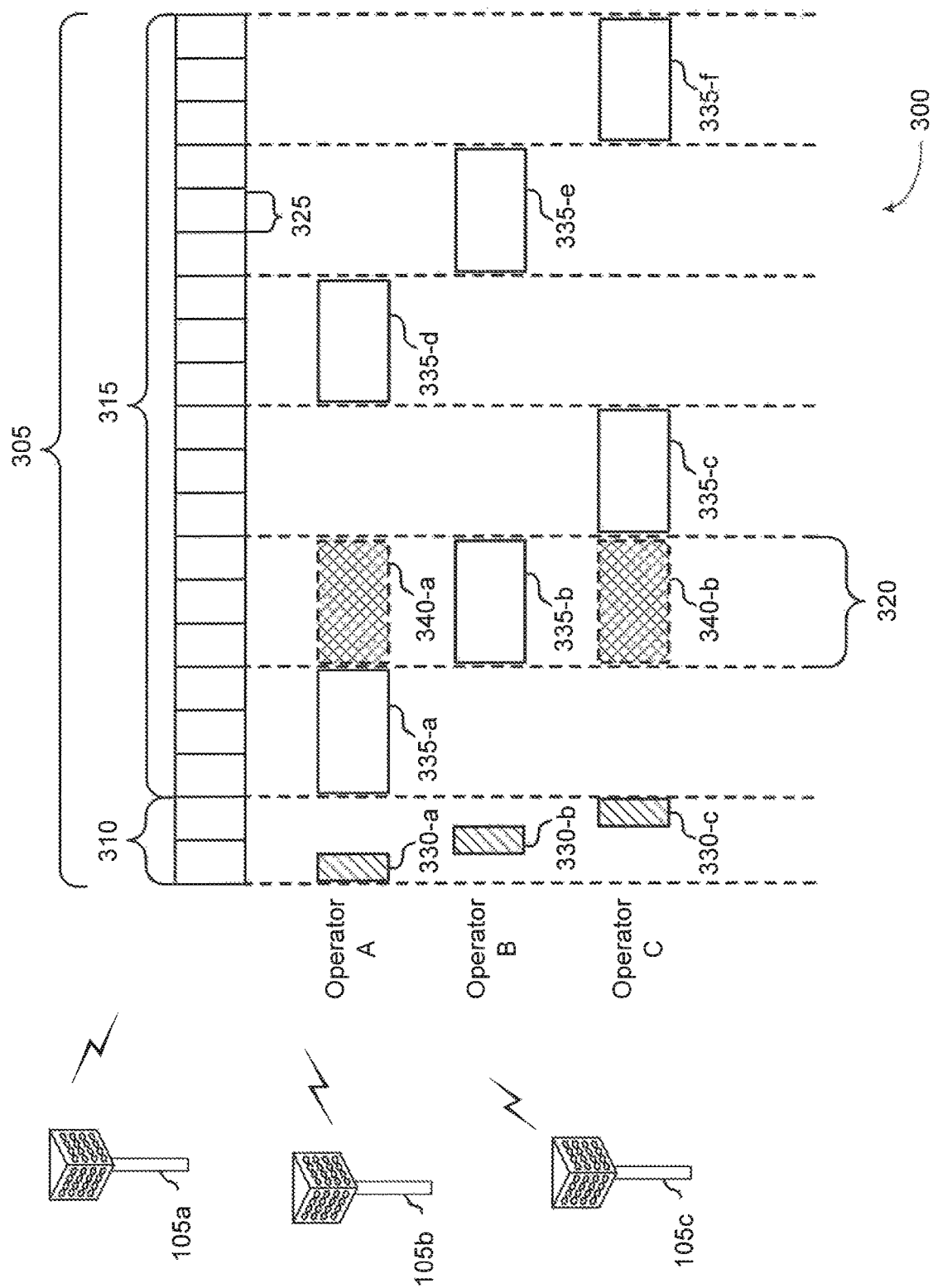
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-*b* may be prioritized for Operator B (e.g., G-INT-OpB), resources 335-*c* may be prioritized for Operator C (e.g., G-IN-OpC), resources 335-*d* may be prioritized for Operator A, resources 335-*e* may be prioritized for Operator B, and resources 335-*f* may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Various different transmission schemes have been suggested that can be used to increased user throughput. The carrier aggregation transmission scheme provides for a UE to simultaneously transmit and receive data on multiple component carriers from either one or more base stations. The dual connectivity transmission scheme also provides for a UE to simultaneously transmit and receive data on multiple component carriers but from base stations in different cell groups. Dual connectivity was developed as a feature for small cell enhancement. A master cell group (MCG) provides at least control plane communications, while the small cells may be characterized as the secondary cell group (SCG) providing for user plane data transmissions. Similar to carrier aggregation, dual connectivity aims to use the radio resource within multiple carriers to improve UE throughput. However, the difference between dual connectivity and carrier aggregation lies in their implementation. Carrier aggregation is generally directed to scenarios in which the backhaul between the nodes/base stations is ideal, while dual connectivity occurs with base stations in the different cell groups with a non-ideal backhaul (e.g., a relatively large delay between nodes/base stations of the different cell groups).

The different base stations in a carrier aggregation are tightly coordinated via the ideal backhaul. Therefore, power control is also tightly coordinated and may handle overlapping transmissions with different transmission durations and some level of symbol misalignment (e.g., half or quarter symbol misalignment), which may arise from transmissions using different numerologies (e.g., 15 kHz vs. 30 kHz symbol length). In dual connectivity, the different participating base stations may not even know of each other's presence. Moreover, there may be very little coordination between the different base stations participating in dual connectivity. For LTE dual connectivity, when overlapping transmissions would exceed available power, LTE UEs would simply scale the power of the SCG communications in order to meet the power limitations.

Figure 4:
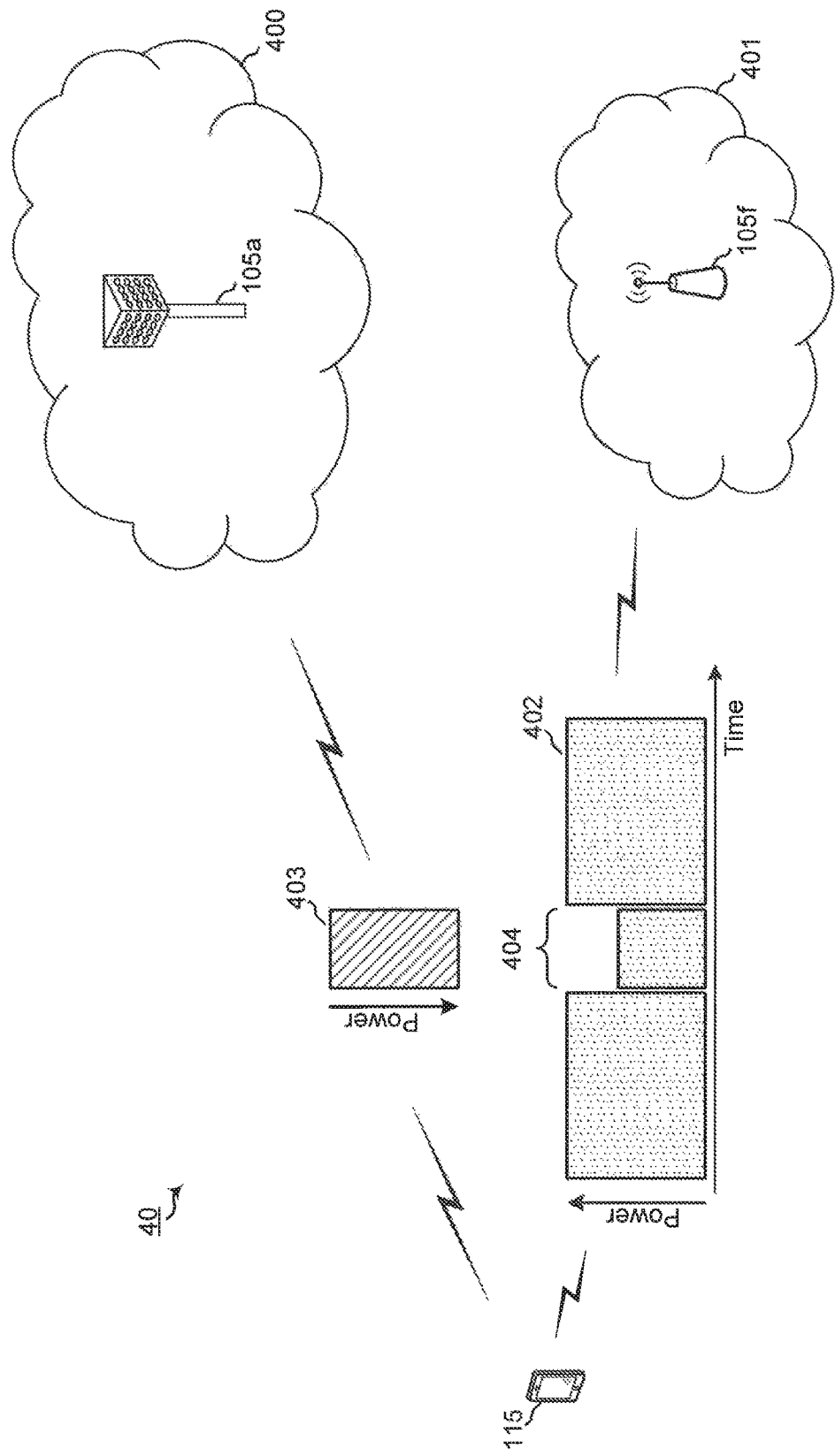
FIG. 4 is a block diagram illustrating a UE in dual connectivity communications with a master cell group (MCG) and secondary cell group (SCG).

FIG. 4 is a block diagram illustrating a UE 115 in dual connectivity communications with a master cell group (MCG) 400 and secondary cell group (SCG) 401. MCG 400 is illustrated showing a single base station, base station 105a, but may include multiple different base stations. Similarly, SCG 401 is illustrated showing a single base station, base station 105f, but may also include multiple base stations. In NR communications, transmissions may be fully misaligned with flexible transmission lengths (e.g., 1-14 symbol transmissions). Therefore, overlapping transmissions could trigger power scaling in the middle of a transmission. Power scaling may cause a phase jump. As illustrated, UE 115 transmits transmission 402 with SCG 401 and transmits transmission 403 with MCG 400. Transmission 403 overlaps with transmission 402 at 404 and triggers power scaling of transmission 402 at 404 as the transmissions with MCG 400 have priority over the transmissions with SCG 401. The transmissions with a power scaling during the middle (404) of transmission 402 could become out of phase and destroy the information for the entire transmission, as the receiving base station would be unlikely to properly decode the information. For example, if transmission 402 with SCG 401 begins using 16QAM modulation, any phase jump caused by middle-of-the-transmission power scaling at 404 would change the resulting constellation points, which the base station, base station 105f, would not expect and, therefore, fail to decode. LTE communications would not have the same potential mid-transmission scaling, as the transmission durations and numerologies would be the same.

From the power control perspective, there is currently no substantial difference between synchronous or asynchronous dual connectivity. In NR deployments, there are two possible frequency ranges used: frequency range 1 (FR1), which defines frequencies below 6 GHz; and frequency range 2 (FR2), which defines millimeter wave frequencies at 24 GHz or above. There is currently no joint power cap applicable for overlapping transmissions in FR1 and FR2. Thus, power control would be the same regardless of whether it's synchronous or asynchronous dual connectivity, or even carrier aggregation. However, within the same frequency range, power control for overlapping transmissions between MCG and SCG may be different, as within each frequency range a power limit would be applicable to overlapping transmissions.

Various aspects of the present disclosure are directed to dual connectivity transmissions between NR MCG and NR SCG. According to the various aspects, a reserved power concept is used to reserve a portion of maximum transmission power that may be used for transmissions with each cell group. For example, the portion of power reserved for MCG may be represented by x, while the portion of power reserved for SCG may be represented by y. x and y may be percentages of maximum power or fixed amounts, such that x+y is less than the total maximum available transmission power. A compatible UE may receive the reserved power information in configuration signals. Such signals may be received in various manners, such as semi-statically, medium access control (MAC) control element (CE) based, slot format information (SFI) based, or dynamic downlink control information (DCI) based.

In various implementations of the present disclosure, $x+y \ll 100\%$. For example, x may be 30% and y may be 20%, leaving 50% of the maximum available transmission power unreserved. Each UE implementation may determine how to access the excess or left-over power. There are two types of excess or left-over power: 1) the unreserved power region $100-(x+y)$; and 2) the unused transmission power of the other carrier group's reserved power. Aspects of the present disclosure provide for rules or procedures for accessing the excess power, whether accessing the unreserved power, the other carrier's reserved power, or both.

It should be noted that currently contemplated dual connectivity systems that provide for simultaneous LTE MCG and NR SCG communications have suggested assigning power limits for each radio access technology (RAT) cell group to avoid overlapping transmissions triggering a power scaling feature within a given transmission. Such power limits would provide for the LTE MCG communications not to exceed a maximum LTE transmission power and NR SCG communications not to exceed a maximum NR transmission power. The various aspects of the present disclosure do not provide such limits, but allow for reserved power within each MCG/SCG carriers that may be supplemented by tapping into the unreserved excess transmission power or more under various conditions.

According to aspects of the present disclosure, UEs in dual connectivity communications may control access to excess transmission power for granted uplink transmissions via one of two different modes. A first mode (mode 1) allows the UE to introduce phase discontinuity to another cell group, while a second mode (mode 2) configures the UE to maintain phase continuity. When operating under either mode, a UE may be configured to respect the reserved power of other cell groups or carriers under most, if not all, circumstances to ensure that cell group communications that stay within the cell group's reserved power will also not experience any phase discontinuity. As will be further explained with regard to mode 2 operations, a UE may be allowed to recycle the reserved power of another cell group if it has sufficient look ahead capability and opportunity.

In operations of a UE configured with a mode 1 selection, the UE is allowed to introduce phase discontinuity. Because the UE can introduce such phase discontinuity, mode 1 provides for updating transmission power controls over a shorter segment of the entire transmission duration. For example, the UE may update transmission power control in each symbols or set of symbols. When the UE receives an uplink grant and power grant that identifies power beyond the reserved power, the UE allocates the excess power (including the unreserved power and the reserved power of the other cell group) to accommodate the power grant.

The power allocation would follow basic priority rules. For example, MCG communications have priority over SCG communications. Moreover, communication type priorities may also play a role in power allocation priority. Ultra-high reliability, low latency communications (URLLC) would have priority over enhanced mobile broadband (eMBB) communications. Thus, if the granted SCG communications included URLLC traffic while the overlapping granted MCG communications included eMBB traffic, the SCG communications would take priority in the power allocation because the traffic type priority takes precedence over carrier priority.

With the ability to introduce phase discontinuity, the UE does not consider overlapping transmissions in mode 1. The UE would be configured to follow CA-like scaling rules, thus, triggering power scaling for the non-priority transmission where overlapping transmissions would cause the maximum power to be exceeded otherwise. Ideally, a UE would not access the other carrier's reserved power except when the UE knows there can be no transmission taking place by the other carrier group. In some circumstances, the UE may know that one of the cell groups (e.g., SCG) may have a very low transmission schedule. Thus, the likelihood of an overlapping transmission with this cell group causing the discontinuity would be very low.

In operations of a UE configured with a mode 2 selection, the UE is configured to maintain phase continuity. In order to tap into another cell group's reserved power, the UE is configured with a look-ahead procedure to determine any scheduled transmissions from the other cell groups during the transmission duration. The transmission power control would, therefore, be applied based on the known overlapping transmissions within the transmission duration based on the transmission priority. Because the UE is configured to consider other overlapping transmissions, the transmission power control may be provided for the entire transmission duration. As in mode 1, the UE configured for mode 2 operations allocates power according to the transmission priorities. For example, as above, MCG transmissions have priority over SCG transmissions, and transmission type priority is also considered. URLLC transmissions have priority over eMBB transmissions and, despite the mode 2 configuration, could cause phase discontinuity when allocating power between transmission types. Mode 2 does not require phase continuity for eMBB traffic when the eMBB traffic is scaled due to overlapping URLLC traffic in the other cell group. The mode 2 UE would, however, be configured to maintain phase continuity for same priority traffic. (E.g. phase continuity maintained for eMBB vs. eMBB or URLLC vs. URLLC.)

According to various aspects of the present disclosure, the look-ahead feature of mode 2 may be implemented at the UE in various ways. For example, when a UE prepares for a dual connectivity transmission, it may identify each processed grant that schedules its transmission during the transmission duration of the first dual connectivity transmission the UE is preparing. With the knowledge of each such potentially overlapping transmission, the UE may then jointly allocate transmission power that respects each cell group's reserved power and provided access to the excess power according to the priority of each identified transmission.

In another example implementation of the look-ahead feature of mode 2, the UE maintains some commonality with uplink control information (UCI) multiplexing rules. In preparation for the first scheduled transmission, the UE performs an internal simulation by grouping any known overlapping transmissions. Within each group, the UE simulates hypothetically moving all transmissions (except earliest) so that leading edges of these moved transmissions align with start of earliest transmission. For each such known transmission, the UE may then individually check whether time line requirement is met. The timeline requirement would be met if the associated trigger or grant received for the individual transmission was received at the UE with enough time for the UE to process the grant and transmit the transmission beginning at the simulated earliest transmission time. Thus, the timeline is measured from original (unmoved) grant/trigger to the simulated moved transmission time. Trigger or grant may include a virtual grant, PDSCH, and the like. If timeline requirement is met for all such known transmissions, the UE performs joint power determination and allocation. Otherwise, for each transmission where the timeline requirement is not met, power determination and allocation would be determined on a "first come first served" basis. Thus, under this simulation implementation of the look-ahead feature, a determination of either joint power allocation or not is made after the simulation. If the simulation results in transmissions where the timeline require has been met, the UE will perform joint power allocation for those transmission. Otherwise, the UE performs power allocation on a transmission-by-transmission basis.

While such example implementation maintains some of the UCI multiplexing rules, others of the UCI multiplexing rules are not maintained. Thus, an error case will not be declared in any occurrence of not meeting timeline requirements. Additionally, groups are not broken up at slot boundaries, while "infinite" groups may be formed at least in the asynchronous transmissions case.

Figure 5:
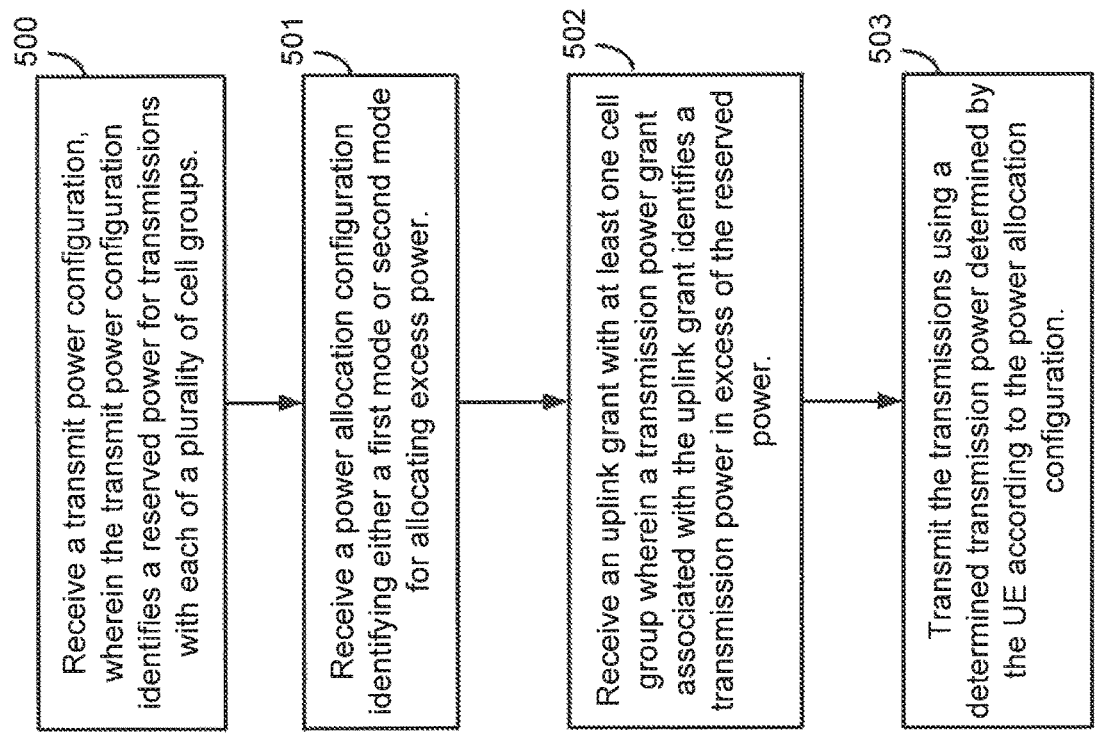
FIG. 5 is a block diagram illustrating example blocks executed to implement one aspect of the present disclosure.
Figure 7:
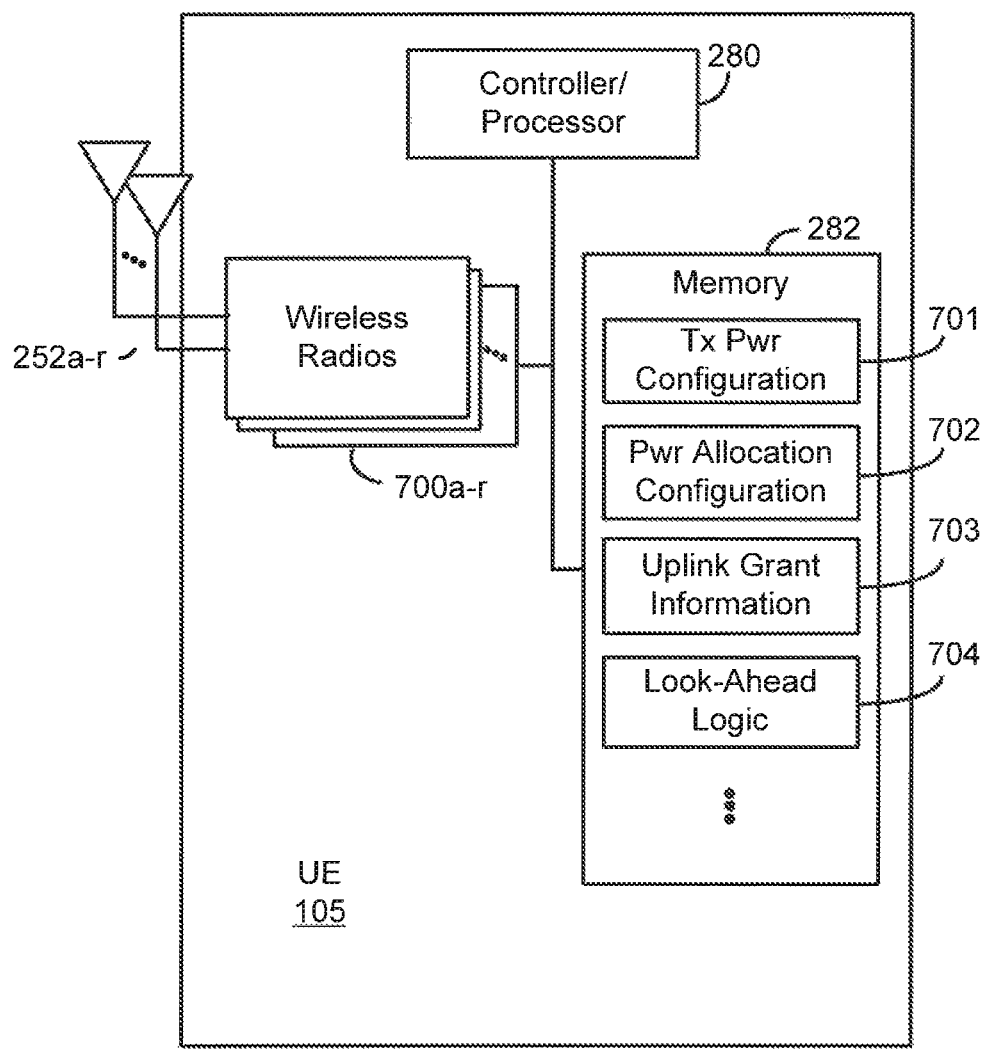
FIG. 7 is a block diagram illustrating a UE configured according to one aspect of the present disclosure.

FIG. 5 is a block diagram illustrating example blocks executed to implement one aspect of the present disclosure. The example blocks will also be described with respect to UE 115 as illustrated in FIG. 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700a-r and antennas 252a-r. Wireless radios 700a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE receives a transmit power configuration, wherein the transmit power configuration identifies a reserved power for transmissions with each of a plurality of cell groups, wherein a sum of the reserved power for all of the plurality of cell groups remains within a maximum transmission power. A UE, such as UE 115, would receive the configuration via antennas 252a-r and wireless radios 700a-r and store in memory 282 at transmit power configuration 701. Transmit power configuration 701 would include the reserved transmission power designated for each cell group that UE 115 will be participating in dual connectivity communication.

At block 501, the UE receives a power allocation configuration identifying either a first mode for allocating excess power above the reserved power for the transmissions over a transmission segment of a plurality of transmission segments of a transmission duration, or a second mode for allocating the excess power above the reserved power for the transmissions over the transmission duration. UE 115 would receive the configuration via antennas 252a-r and wireless radios 700a-r and store in memory 282 at power allocation configuration 702. The power allocation configuration received by UE 115 may be received as a RRC configuration between two modes for allocation of excess transmission power beyond the reserved power for each cell group as identified at transmit power configuration 701. Power allocation configuration 702 also includes logic for implementing the functionalities of mode 1 and mode 2 for managing allocation of the excess power to any of the scheduled transmissions.

At block 502, the UE receives an uplink grant for the transmissions with at least one cell group of the plurality of cell groups, wherein a transmission power grant associated with the uplink grant identifies a transmission power for the at least one cell group in excess of the reserved power. As UE 115 receives uplink grants via antennas 252a-r and wireless radios 700a-r, the grant information is stored in memory 282 at uplink grant information 703. Uplink grant information 703 includes grant information, transmission power control messages, scheduling information, and the like. Depending on the mode designated by the power allocation configuration, UE 115, under control of controller/processor 280 executes the logic for either mode 1 or mode 2 in power allocation configuration 702. Within the execution environment of the mode logic of power allocation configuration 702, UE 115 may determine the transmission power to allocate for overlapping transmissions in dual connectivity communications. For example, in mode 1 operations, UE 115 may allocate access to the excess power where priority transmissions are granted power allocations in excess of their cell group reserved power and determine when to trigger power scaling when priority transmissions are handled during an ongoing transmission duration. In one example aspect of mode 1 operations, when UE 115 allocates access to the excess power, it includes only the unreserved excess power. In additional example aspects of mode 1 operations, UE 115 may allocate all of the excess power, including the reserved power of other cell groups.

In mode 2 operations, UE 115 may further execute, under control of controller/processor 280, look-ahead logic 704. The execution environment of look-ahead logic provides a mechanism for UE 115 to determine each of the known uplink transmissions that will be occurring over the transmission duration of the planned uplink transmission. Determining that there are multiple known transmission scheduled for dual connectivity communications with multiple cell groups, UE 115 may jointly determine the power allocation of any excess transmission power for the known transmissions.

At block 503, the UE transmits the transmissions with the at least one cell group using a determined transmission power determined by the UE according to the power allocation configuration. After determining the transmission power allocation of dual connectivity transmissions, either through the mode 1 or mode 2 functionality, the transmissions would then be transmitted at the determined transmission powers via wireless radios 700a-r and antennas 252a-r.

Figure 6A:
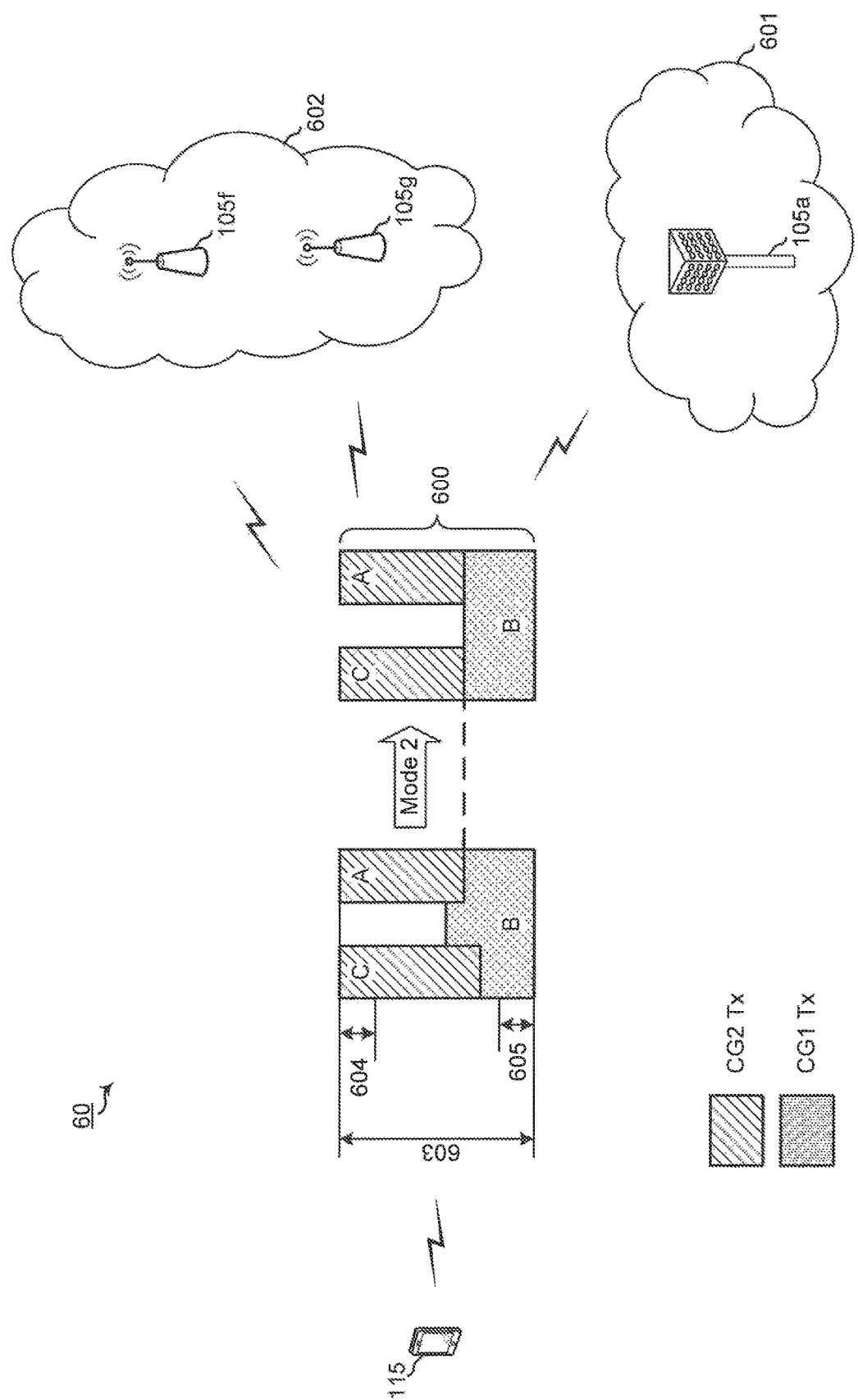
FIGS. 6A-6D are block diagrams illustrating dual connectivity communications between a configured according to one aspect, and first and second cell groups.

FIG. 6A is a block diagram illustrating dual connectivity communications 60 between a UE 115, configured according to one aspect, and first and second cell groups. UE 115 is scheduled for transmissions 600 including transmissions A, B, and C. Transmissions A and C are scheduled with cell group 2 (602), while transmission B is scheduled with cell group 1 (601). Cell group 1 is illustrated with base station 105a, while cell group 2 is illustrated with two base stations, base stations 105f and 105g. As noted above, each cell group may have multiple base stations or access points. The specific base stations illustrated in FIG. 6A are merely to provide a non-limiting example. One of cell groups 1 (601) or 2 (602) may be identified as MCG, while the other group may be identified as SCG.

Transmissions A, B, and C overlap with each other over the transmission duration of transmission B. Among transmissions 600, transmission A has the highest priority, followed by transmission B, and then transmission C. Maximum available transmission power 603 represents to total transmission power available to UE 115 for transmissions during the illustrated period. At a point prior to transmission, UE 115 receives a transmit power configuration that identifies CG2 reserved power 604 and CG1 reserved power 605. CG1 reserved power 605 and CG2 reserved power 604 provide the portion of maximum available transmission power 603 reserved specifically for the particular cell group. For any transmissions where granted transmission power falls within the reserved power, the other cell group may not interfere with the allotted power.

UE 115 also receives a power allocation configuration identifying that UE 115 will operate in mode 2 for access to excess transmission power. As granted, transmissions A, B, and C each exceed CG1 reserved power 605 and CG2 reserved power 604, respectively. This relationship is illustrated in the first illustrated instance of transmissions A, B, and C. The access rules of mode 2 will be used to determine the power allocation of the excess transmission power (maximum available transmission power 603−(CG1 reserved power 605+CG2 reserved power 604)). Each of transmissions A, B, and C have been granted in advance of the start of transmissions B and C. Accordingly, UE 115 may jointly determine and allocate the transmission power among each of transmissions A, B, and C for the transmission duration of transmission B. After application of the rules of mode 2, the actual transmission power allocation, as illustrated in the second instance of transmissions A, B, and C, has been jointly determined to share the excess power. As the highest priority transmission, transmission A is allowed a determined transmission power as its full granted transmission power. As the second highest priority, transmission B is allocated power up to excess power allocated to transmission A. As the lowest priority of the three, transmission C may be allocated up to the transmission power determined for transmission A.

Figure 6B:
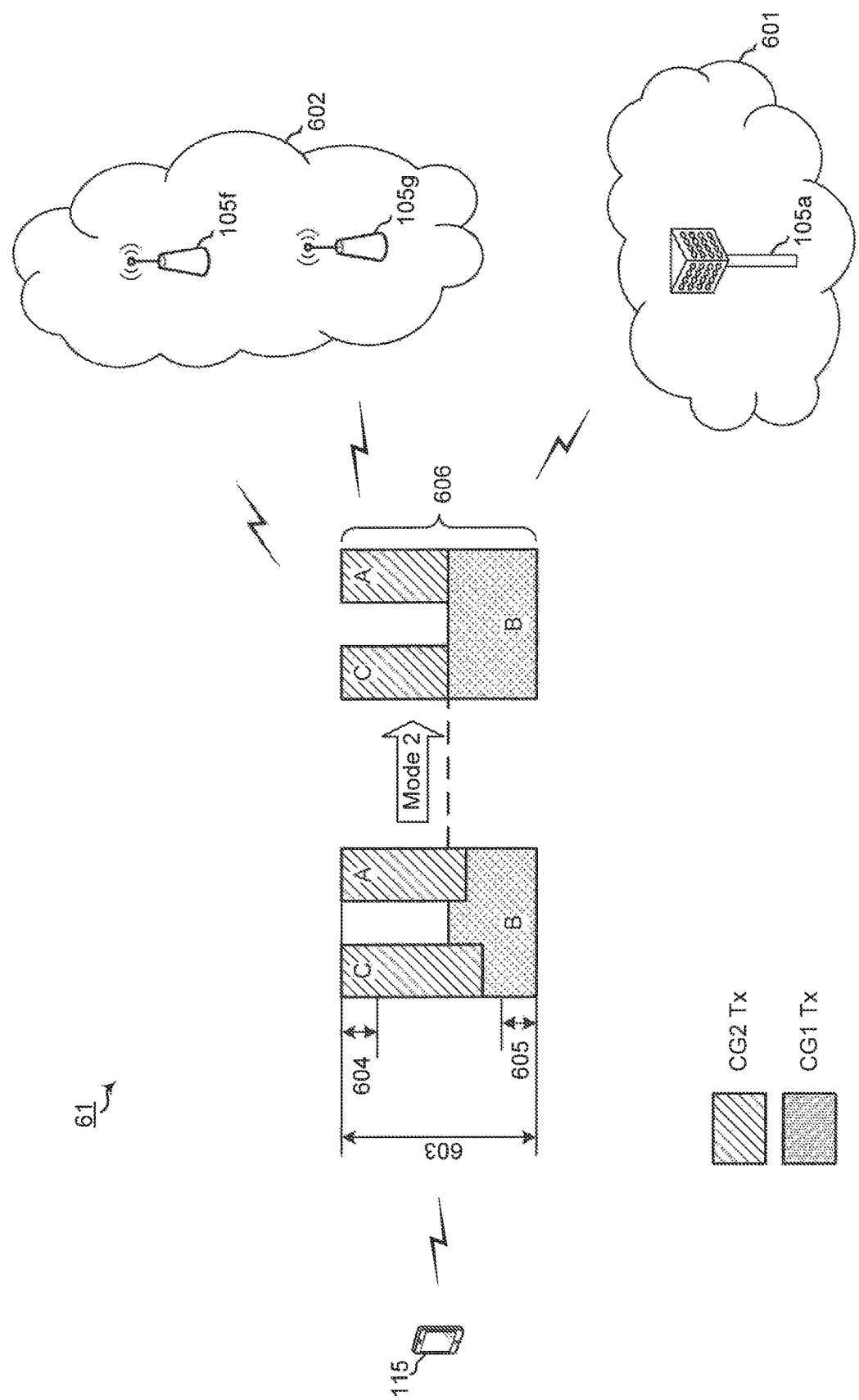

FIG. 6B is a block diagram illustrating dual connectivity communications 61 between a UE 115, configured according to one aspect, and first and second cell groups. Similarly to the scenario depicted for UE 115 in FIG. 6A, the transmit power configuration previously received by UE 115 provides for CG1 reserved power 605 and CG2 reserved power 604 as a portion of maximum available transmission power 603. The power allocation configuration previously received by UE 115 also identifies that UE 115 is to determine access to excess transmission power using mode 2.

For dual connectivity communications 61, transmissions 606 include transmissions A and C with carrier group 2 (602) and transmission B with carrier group 1 (601). Each of transmissions A, B, and C have the same relative priority as in FIG. 6A. However, for purposes of the example aspect illustrated in FIG. 6B, at the time that UE 115 prepares for beginning transmissions B and C, either it has not yet received the grant for transmissions A or has not fully processed the grant. As such, after applying the excess power allocation rules of mode 2, as the highest known and ready transmission, transmission B is allocated the excess power up to its granted transmission power allocation. As the lower-priority transmission, transmission C may only be allocated excess transmission power up to the power allocated to transmission B. When transmission A occurs, as it was either unknown or not fully processed for UE 115 at the beginning of the transmission duration of transmission B, it may only be allocated excess power up to the power allocated to transmission B, even though transmission A is the highest priority transmission among transmissions 606.

It should be noted that according to the example aspect described in FIG. 6B, even if transmission A were URLLC and transmissions B and C were eMBB transmissions, power allocation for URLLC transmission A would be restricted based on the joint power allocation for eMBB transmissions B and C.

Figure 6C:
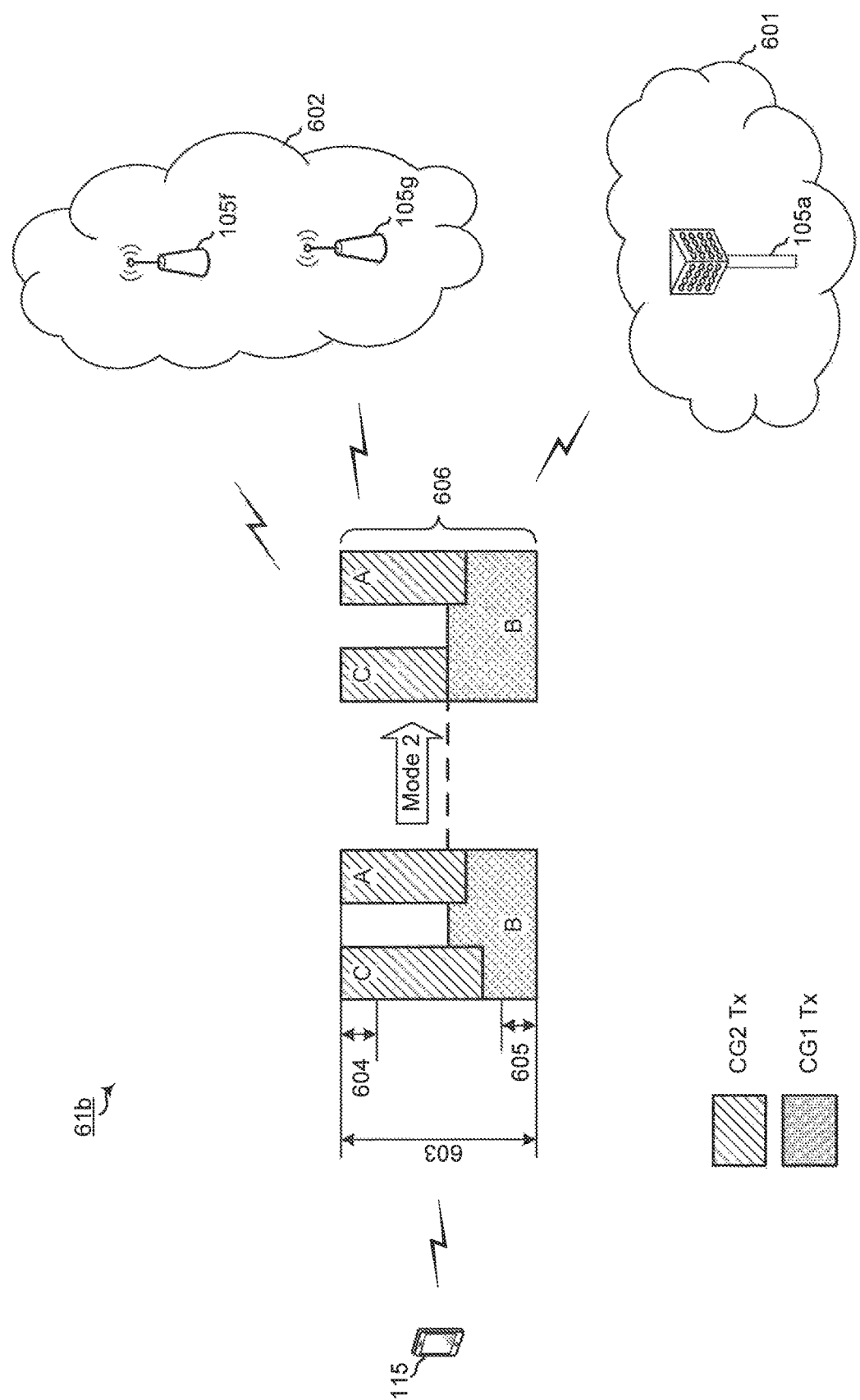

FIG. 6C is a block diagram illustrating dual connectivity communications 61b between a UE 115, configured according to one aspect, and first and second cell groups. Similarly to the scenario depicted for UE 115 in FIGS. 6A and 6B, the transmit power configuration previously received by UE 115 provides for CG1 reserved power 605 and CG2 reserved power 604 as a portion of maximum available transmission power 603. The power allocation configuration previously received by UE 115 also identifies that UE 115 is to determine access to excess transmission power using mode 2. The scenario for the example illustrated in FIG. 6C is almost identical to the example of FIG. 6B, except for treatment of super-priority transmissions (e.g., URLLC vs. eMBB transmissions).

For dual connectivity communications 61b, transmissions 606 include transmissions A and C with carrier group 2 (602) and transmission B with carrier group 1 (601). Each of transmissions A, B, and C have the same relative priority as in FIGS. 6A and 6B, with transmission A being URLLC while transmissions B and C are eMBB. However, for purposes of the example aspect illustrated in FIG. 6C, at the time that UE 115 prepares for beginning eMBB transmissions B and C, either it has not yet received the grant for URLLC transmissions A or has not fully processed the grant. As such, after applying the excess power allocation rules of mode 2, as the highest known and ready transmission, transmission B is allocated the excess power up to its granted transmission power allocation. As the lower-priority transmission, transmission C may only be allocated excess transmission power up to the power allocated to transmission B. When URLLC transmission A occurs, however, as it has a "super" priority over eMBB transmissions, it would be allocated its full power, causing a power scaling to transmission B during the middle of its transmission. In such case, the information contained within transmission B may be lost.

Figure 6D:
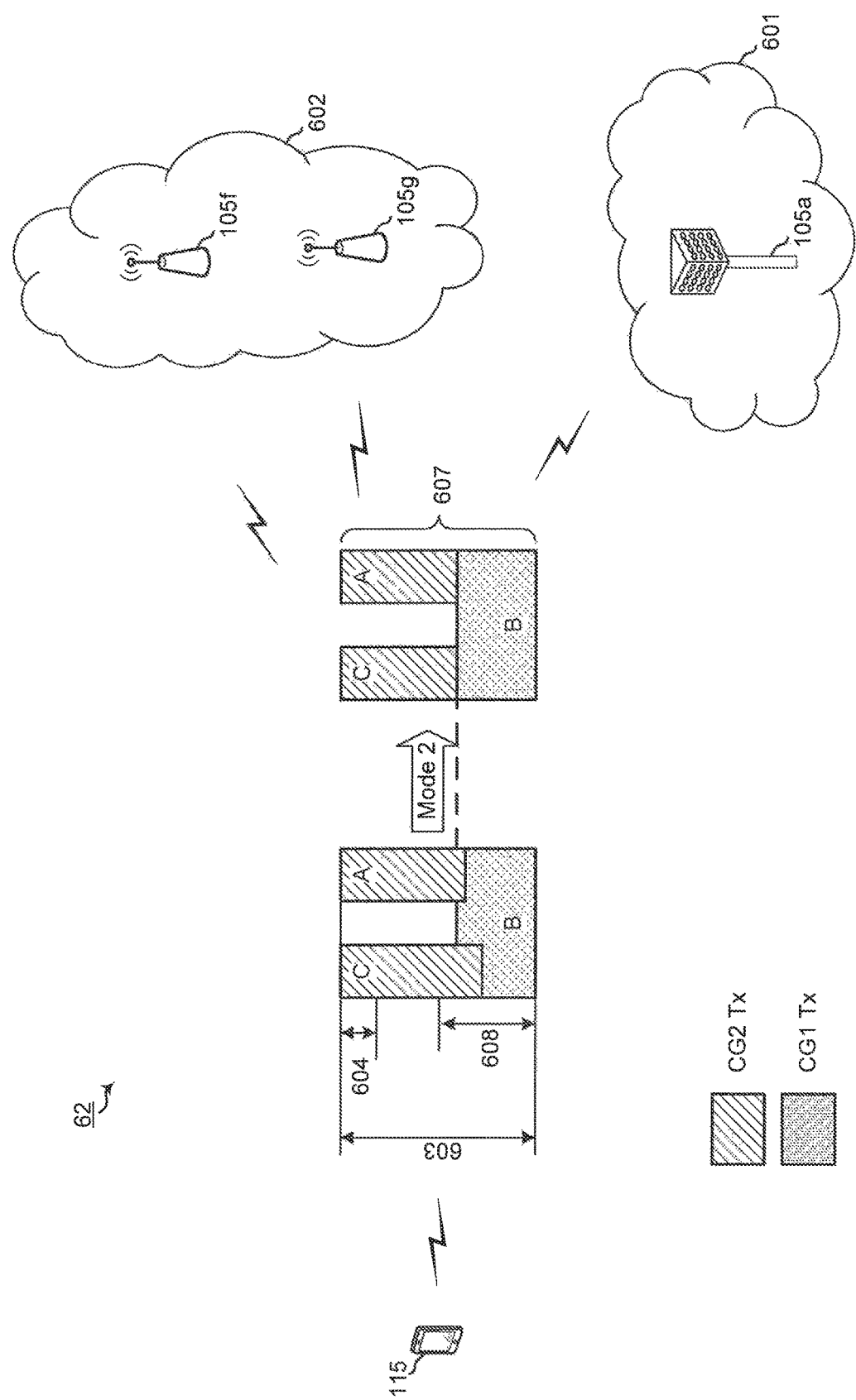

FIG. 6D is a block diagram illustrating dual connectivity communications 62 between a UE 115, configured according to one aspect, and first and second cell groups. The transmit power configuration previously received by UE 115 in the example implementation illustrated in FIG. 6C provides for CG1 reserved power 608 (much higher transmission power than CG1 reserved power 605 provided for in FIGS. 6A and 6B) and CG2 reserved power 604 as a portion of maximum available transmission power 603. The power allocation configuration previously received by UE 115 also identifies that UE 115 is to determine access to excess transmission power using mode 2.

For dual connectivity communications 62, transmissions 607 include transmissions A and C with carrier group 2 (602) and transmission B with carrier group 1 (601). Each of transmissions A, B, and C have the same relative priority as in FIGS. 6A, 6B, and 6C and are each fully known by UE 115 when UE 115 is preparing to begin transmissions of transmissions B and C. After applying the allocation rules of mode 2, even though transmission A has the highest priority, the transmission power grant for transmission B falls within CG1 reserved power 608. As such, UE 115 cannot determine to allocate transmission A any excess power that would encroach upon CG1 reserved power 608 for transmission B. Similarly, power allocation to transmission C is limited to the full power allocation for transmission B.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a user equipment (UE), a transmit power configuration, wherein the transmit power configuration identifies a reserved power for transmissions with each of a plurality of cell groups, wherein a sum of the reserved power for all of the plurality of cell groups remains within a maximum transmission power;
receiving, by the UE, a power allocation configuration identifying one of:
a first mode for allocating excess power above the reserved power for the transmissions over a transmission segment of a plurality of transmission segments of a transmission duration, and
a second mode for allocating the excess power above the reserved power for the transmissions over the transmission duration;

receiving, by the UE, an uplink grant for the transmissions with at least one cell group of the plurality of cell groups, wherein a transmission power grant associated with the uplink grant identifies a transmission power for the at least one cell group in excess of the reserved power; and transmitting, by the UE, the transmissions with the at least one cell group using a determined transmission power determined by the UE according to the power allocation configuration.

2. The method of claim 1, wherein the power allocation configuration identifies the first mode, the method further including:

determining, by the UE, the excess power as the reserved power for each of one or more cell groups of the plurality of cell groups other than the at least one cell group plus unreserved power, wherein the unreserved power includes the maximum transmission power minus the sum of the reserved power for all of the plurality of cell groups;

allocating, by the UE, the determined transmission power for the transmission segment as the transmission power up the reserved power of the at least one cell group plus one of:
the unreserved power, or
the excess power; and repeating, by the UE, the determining the excess power, the allocating, and the transmitting for each remaining transmission segment of the plurality of transmission segments.

3. The method of claim 2, further including:

identifying, by the UE during the transmission segment, a high priority type transmission with a high priority cell group of the plurality of cell groups, wherein the high priority type transmission has priority over the transmissions;

scaling, by the UE, the determined transmission power to accommodate transmission by the UE of the high priority type transmission during the transmission segment at a high priority transmission power including the reserved power of the high priority cell group and at least a portion of the excess power, wherein the transmitting includes transmitting the high priority type transmission at the high priority transmission power and wherein the scaled determined transmission power plus the high priority transmission power remains within the maximum transmission power.

4. The method of claim 1, wherein the power allocation configuration identifies the second mode, the method further including:

identifying, by the UE at a beginning of the transmission duration, each known uplink transmission grant for additional uplink transmissions with one or more cell groups of the plurality of cell groups during the transmission duration;

determining, by the UE, the excess power as one of:
the reserved power for each of one or more remaining cell groups of the plurality of cell groups other than the at least one cell group and the one or more cell groups plus unreserved power, or
the unreserved power,
wherein the unreserved power includes the maximum transmission power minus the sum of the reserved power for all of the plurality of cell groups; and allocating, by the UE, the determined transmission power as the transmission power up to the reserved power of the at least one cell group plus the excess power.

5. The method of claim 4, further including:

identifying, by the UE during the transmission duration, a high priority type transmission with a high priority cell group of the plurality of cell groups, wherein the high priority type transmission has priority over the transmissions;

scaling, by the UE, the determined transmission power to accommodate transmission by the UE of the high priority type transmission during a high priority transmission duration at a high priority transmission power including the reserved power of the high priority cell group and at least a portion of the excess power, wherein the transmitting further includes transmitting the high priority type transmission at the high priority transmission power and wherein the scaled determined transmission power plus the high priority transmission power remains within the maximum transmission power.

6. The method of claim 4, further including:

identifying, by the UE during the transmission duration, an additional uplink transmission for transmission with a cell group of the plurality of cell groups, wherein the additional uplink transmission was unknown at a beginning of the transmission duration; and allocating, by the UE, an additional transmission power for the additional uplink transmission as the reserved power associated with the cell group and a remaining excess power including a remaining portion of the unreserved power unallocated to the determined transmission power, wherein the transmitting further includes transmitting the additional uplink transmission according to the additional transmission power.

7. The method of claim 1, wherein the transmit power configuration and the power allocation configuration are received by the UE via one of:
semi-statically;
dynamically;
medium access control (MAC) control element (CE) signaling;
slot format information (SFI) signaling; or
downlink control information (DCI) signaling.

8. An apparatus configured for wireless communication, comprising:

means for receiving, at a user equipment (UE), a transmit power configuration, wherein the transmit power configuration identifies a reserved power for transmissions with each of a plurality of cell groups, wherein a sum of the reserved power for all of the plurality of cell groups remains within a maximum transmission power;

means for receiving, by the UE, a power allocation configuration identifying one of:
a first mode for allocating excess power above the reserved power for the transmissions over a transmission segment of a plurality of transmission segments of a transmission duration, and
a second mode for allocating the excess power above the reserved power for the transmissions over the transmission duration;

means for receiving, by the UE, an uplink grant for the transmissions with at least one cell group of the plurality of cell groups, wherein a transmission power grant associated with the uplink grant identifies a transmission power for the at least one cell group in excess of the reserved power; and means for transmitting, by the UE, the transmissions with the at least one cell group using a determined transmission power determined by the UE according to the power allocation configuration.

9. The apparatus of claim 8, wherein the power allocation configuration identifies the first mode, the apparatus further including:
means for determining, by the UE, the excess power as the reserved power for each of one or more cell groups of the plurality of cell groups other than the at least one cell group plus unreserved power, wherein the unreserved power includes the maximum transmission power minus the sum of the reserved power for all of the plurality of cell groups;
means for allocating, by the UE, the determined transmission power for the transmission segment as the transmission power up to the reserved power of the at least one cell group plus one of:
the unreserved power, or
the excess power; and
means for repeating, by the UE, the means for determining the excess power, the means for allocating, and the means for transmitting for each remaining transmission segment of the plurality of transmission segments.

10. The apparatus of claim 9, further including:
means for identifying, by the UE during the transmission segment, a high priority type transmission with a high priority cell group of the plurality of cell groups, wherein the high priority type transmission has priority over the transmissions;
means for scaling, by the UE, the determined transmission power to accommodate transmission by the UE of the high priority type transmission during the transmission segment at a high priority transmission power including the reserved power of the high priority cell group and at least a portion of the excess power, wherein the means for transmitting includes means for transmitting the high priority type transmission at the high priority transmission power and wherein the scaled determined transmission power plus the high priority transmission power remains within the maximum transmission power.

11. The apparatus of claim 8, wherein the power allocation configuration identifies the second mode, the apparatus further including:
means for identifying, by the UE at a beginning of the transmission duration, each known uplink transmission grant for additional uplink transmissions with one or more cell groups of the plurality of cell groups during the transmission duration;
means for determining, by the UE, the excess power as one of:
the reserved power for each of one or more remaining cell groups of the plurality of cell groups other than the at least one cell group and the one or more cell groups plus unreserved power, or
the unreserved power,
wherein the unreserved power includes the maximum transmission power minus the sum of the reserved power for all of the plurality of cell groups; and
means for allocating, by the UE, the determined transmission power as the transmission power up to the reserved power of the at least one cell group plus the excess power.

12. The apparatus of claim 11, further including:
means for identifying, by the UE during the transmission duration, a high priority type transmission with a high priority cell group of the plurality of cell groups, wherein the high priority type transmission has priority over the transmissions;
means for scaling, by the UE, the determined transmission power to accommodate transmission by the UE of the high priority type transmission during a high priority transmission duration at a high priority transmission power including the reserved power of the high priority cell group and at least a portion of the excess power, wherein the means for transmitting further includes means for transmitting the high priority type transmission at the high priority transmission power and wherein the scaled determined transmission power plus the high priority transmission power remains within the maximum transmission power.

13. The apparatus of claim 11, further including:
means for identifying, by the UE during the transmission duration, an additional uplink transmission for transmission with a cell group of the plurality of cell groups, wherein the additional uplink transmission was unknown at a beginning of the transmission duration; and
means for allocating, by the UE, an additional transmission power for the additional uplink transmission as the reserved power associated with the cell group and a remaining excess power including a remaining portion of the unreserved power unallocated to the determined transmission power, wherein the means for transmitting further includes means for transmitting the additional uplink transmission according to the additional transmission power.

14. The apparatus of claim 8, wherein the transmit power configuration and the power allocation configuration are received by the UE via one of:
semi-statically;
dynamically;
medium access control (MAC) control element (CE) signaling;
slot format information (SFI) signaling; or
downlink control information (DCI) signaling.

15. A non-transitory computer-readable medium having program code recorded thereon, the program code comprising:
program code executable by a computer for causing the computer to receive, at a user equipment (UE), a transmit power configuration, wherein the transmit power configuration identifies a reserved power for transmissions with each of a plurality of cell groups, wherein a sum of the reserved power for all of the plurality of cell groups remains within a maximum transmission power;
program code executable by the computer for causing the computer to receive, by the UE, a power allocation configuration identifying one of:
a first mode for allocating excess power above the reserved power for the transmissions over a transmission segment of a plurality of transmission segments of a transmission duration, and
a second mode for allocating the excess power above the reserved power for the transmissions over the transmission duration;
program code executable by the computer for causing the computer to receive, by the UE, an uplink grant for the transmissions with at least one cell group of the plurality of cell groups, wherein a transmission power grant associated with the uplink grant identifies a transmission power for the at least one cell group in excess of the reserved power; and program code executable by the computer for causing the computer to transmit, by the UE, the transmissions with the at least one cell group using a determined transmission power determined by the UE according to the power allocation configuration.

16. The non-transitory computer-readable medium of claim 15, wherein the power allocation configuration identifies the first mode, the non-transitory computer-readable medium further including:

program code executable by the computer for causing the computer to determine, by the UE, the excess power as the reserved power for each of one or more cell groups of the plurality of cell groups other than the at least one cell group plus unreserved power, wherein the unreserved power includes the maximum transmission power minus the sum of the reserved power for all of the plurality of cell groups;

program code executable by the computer for causing the computer to allocate, by the UE, the determined transmission power for the transmission segment as the transmission power up to the reserved power of the at least one cell group plus one of:
the unreserved power, or
the excess power; and program code executable by the computer for causing the computer to repeat, by the UE, execution of the program code executable by the computer for causing the computer to determine the excess power, to allocate, and to transmit for each remaining transmission segment of the plurality of transmission segments.

17. The non-transitory computer-readable medium of claim 16, further including:

program code executable by the computer for causing the computer to identify, by the UE during the transmission segment, a high priority type transmission with a high priority cell group of the plurality of cell groups, wherein the high priority type transmission has priority over the transmissions;

program code executable by the computer for causing the computer to scale, by the UE, the determined transmission power to accommodate transmission by the UE of the high priority type transmission during the transmission segment at a high priority transmission power including the reserved power of the high priority cell group and at least a portion of the excess power, wherein the program code executable by the computer for causing the computer to transmit includes program code executable by the computer for causing the computer to transmit the high priority type transmission at the high priority transmission power and wherein the scaled determined transmission power plus the high priority transmission power remains within the maximum transmission power.

18. The non-transitory computer-readable medium of claim 15, wherein the power allocation configuration identifies the second mode, the non-transitory computer-readable medium further including:

program code executable by the computer for causing the computer to identify, by the UE at a beginning of the transmission duration, each known uplink transmission grant for additional uplink transmissions with one or more cell groups of the plurality of cell groups during the transmission duration;

program code executable by the computer for causing the computer to determine, by the UE, the excess power as one of:
the reserved power for each of one or more remaining cell groups of the plurality of cell groups other than the at least one cell group and the one or more cell groups plus unreserved power, or
the unreserved power,
wherein the unreserved power includes the maximum transmission power minus the sum of the reserved power for all of the plurality of cell groups; and program code executable by the computer for causing the computer to allocate, by the UE, the determined transmission power as the transmission power up to the reserved power of the at least one cell group plus the excess power.

19. The non-transitory computer-readable medium of claim 18, further including:

program code executable by the computer for causing the computer to identify, by the UE during the transmission duration, a high priority type transmission with a high priority cell group of the plurality of cell groups, wherein the high priority type transmission has priority over the transmissions;

program code executable by the computer for causing the computer to scale, by the UE, the determined transmission power to accommodate transmission by the UE of the high priority type transmission during a high priority transmission duration at a high priority transmission power including the reserved power of the high priority cell group and at least a portion of the excess power, wherein the program code executable by the computer for causing the computer to transmit further includes program code executable by the computer for causing the computer to transmit the high priority type transmission at the high priority transmission power and wherein the scaled determined transmission power plus the high priority transmission power remains within the maximum transmission power.

20. The non-transitory computer-readable medium of claim 18, further including:

program code executable by the computer for causing the computer to identify, by the UE during the transmission duration, an additional uplink transmission for transmission with a cell group of the plurality of cell groups, wherein the additional uplink transmission was unknown at a beginning of the transmission duration; and program code executable by the computer for causing the computer to allocate, by the UE, an additional transmission power for the additional uplink transmission as the reserved power associated with the cell group and a remaining excess power including a remaining portion of the unreserved power unallocated to the determined transmission power, wherein the program code executable by the computer for causing the computer to transmit further includes program code executable by the computer for causing the computer to transmit the additional uplink transmission according to the additional transmission power.

21. The non-transitory computer-readable medium of claim 15, wherein the transmit power configuration and the power allocation configuration are received by the UE via one of:
semi-statically;
dynamically;

medium access control (MAC) control element (CE) signaling;
slot format information (SFI) signaling; or
downlink control information (DCI) signaling.

22. An apparatus configured for wireless communication, the apparatus comprising:
at least one processor; and
a memory coupled to the at least one processor,
wherein the at least one processor is configured:
to receive, at a user equipment (UE), a transmit power configuration, wherein the transmit power configuration identifies a reserved power for transmissions with each of a plurality of cell groups, wherein a sum of the reserved power for all of the plurality of cell groups remains within a maximum transmission power;
to receive, by the UE, a power allocation configuration identifying one of:
a first mode for allocating excess power above the reserved power for the transmissions over a transmission segment of a plurality of transmission segments of a transmission duration, and
a second mode for allocating the excess power above the reserved power for the transmissions over the transmission duration;
to receive, by the UE, an uplink grant for the transmissions with at least one cell group of the plurality of cell groups, wherein a transmission power grant associated with the uplink grant identifies a transmission power for the at least one cell group in excess of the reserved power; and
to transmit, by the UE, the transmissions with the at least one cell group using a determined transmission power determined by the UE according to the power allocation configuration.

23. The apparatus of claim 22, wherein the power allocation configuration identifies the first mode, the apparatus further including configuration of the at least one processor:
to determine, by the UE, the excess power as the reserved power for each of one or more cell groups of the plurality of cell groups other than the at least one cell group plus unreserved power, wherein the unreserved power includes the maximum transmission power minus the sum of the reserved power for all of the plurality of cell groups;
to allocate, by the UE, the determined transmission power for the transmission segment as the transmission power up to the reserved power of the at least one cell group plus one of:
the unreserved power, or
the excess power; and
to repeat, by the UE, execution of the configuration of the at least one processor to determine the excess power, to allocate, and to transmit for each remaining transmission segment of the plurality of transmission segments.

24. The apparatus of claim 23, further including configuration of the at least one processor:
to identify, by the UE during the transmission segment, a high priority type transmission with a high priority cell group of the plurality of cell groups, wherein the high priority type transmission has priority over the transmissions;
to scale, by the UE, the determined transmission power to accommodate transmission by the UE of the high priority type transmission during the transmission segment at a high priority transmission power including the reserved power of the high priority cell group and at least a portion of the excess power, wherein the configuration of the at least one processor to transmit includes configuration to transmit the high priority type transmission at the high priority transmission power and wherein the scaled determined transmission power plus the high priority transmission power remains within the maximum transmission power.

25. The apparatus of claim 22, wherein the power allocation configuration identifies the second mode, the apparatus further including configuration of the at least one processor:
to identify, by the UE at a beginning of the transmission duration, each known uplink transmission grant for additional uplink transmissions with one or more cell groups of the plurality of cell groups during the transmission duration;
to determine, by the UE, the excess power as one of:
the reserved power for each of one or more remaining cell groups of the plurality of cell groups other than the at least one cell group and the one or more cell groups plus unreserved power, or
the unreserved power,
wherein the unreserved power includes the maximum transmission power minus the sum of the reserved power for all of the plurality of cell groups; and
to allocate, by the UE, the determined transmission power as the transmission power up to the reserved power of the at least one cell group plus the excess power.

26. The apparatus of claim 25, further including configuration of the at least one processor:
to identify, by the UE during the transmission duration, a high priority type transmission with a high priority cell group of the plurality of cell groups, wherein the high priority type transmission has priority over the transmissions;
to scale, by the UE, the determined transmission power to accommodate transmission by the UE of the high priority type transmission during a high priority transmission duration at a high priority transmission power including the reserved power of the high priority cell group and at least a portion of the excess power, wherein the configuration of the at least one processor to transmit further includes configuration to transmit the high priority type transmission at the high priority transmission power and wherein the scaled determined transmission power plus the high priority transmission power remains within the maximum transmission power.

27. The apparatus of claim 25, further including configuration of the at least one processor:
to identify, by the UE during the transmission duration, an additional uplink transmission for transmission with a cell group of the plurality of cell groups, wherein the additional uplink transmission was unknown at a beginning of the transmission duration; and
to allocate, by the UE, an additional transmission power for the additional uplink transmission as the reserved power associated with the cell group and a remaining excess power including a remaining portion of the unreserved power unallocated to the determined transmission power, wherein the configuration of the at least one processor to transmit further includes configuration to transmit the additional uplink transmission according to the additional transmission power.

28. The apparatus of claim 22, wherein the transmit power configuration and the power allocation configuration are received by the UE via one of:

semi-statically;
dynamically;
medium access control (MAC) control element (CE) signaling;
slot format information (SFI) signaling; or
downlink control information (DCI) signaling.

\* \* \* \* \*